US006877017B1

United States Patent
Beom

(10) Patent No.: US 6,877,017 B1
(45) Date of Patent: Apr. 5, 2005

(54) DEVICE AND METHOD FOR FILTERING ADDED INFORMATION

(75) Inventor: Jae Young Beom, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/482,926

(22) Filed: Jan. 14, 2000

(30) Foreign Application Priority Data

Jan. 14, 1999 (KR) .......................................... 1999-859

(51) Int. Cl.[7] .............................................. G06F 17/30
(52) U.S. Cl. ........................... 707/203; 707/3; 370/389; 370/412
(58) Field of Search .......................... 707/3, 203, 1–10, 707/100, 104.1; 370/389, 412

(56) References Cited

U.S. PATENT DOCUMENTS

| 5,469,431 A | * | 11/1995 | Wendorf et al. ............. 370/254 |
| 5,844,478 A | * | 12/1998 | Blatter et al. ............... 348/474 |
| 5,951,639 A | * | 9/1999 | MacInnis ...................... 725/70 |
| 6,091,772 A | * | 7/2000 | Anderson et al. ...... 375/240.26 |
| 6,115,434 A | * | 9/2000 | Mizobata et al. ........... 375/340 |
| 6,134,554 A | * | 10/2000 | Freimann et al. ........... 707/100 |
| 6,175,577 B1 | * | 1/2001 | Van Den Heuvel ......... 370/537 |
| 6,181,706 B1 | * | 1/2001 | Anderson et al. ........... 370/412 |
| 6,229,801 B1 | * | 5/2001 | Anderson et al. ........... 370/389 |
| 6,263,497 B1 | * | 7/2001 | Maeda et al. ............... 717/170 |
| 6,363,061 B1 | * | 3/2002 | Yuzawa ....................... 370/345 |
| 6,504,826 B1 | * | 1/2003 | Kato et al. .................. 370/312 |
| 6,535,530 B1 | * | 3/2003 | Matsui ........................ 370/536 |
| 6,549,528 B2 | * | 4/2003 | Yuzawa ....................... 370/345 |

OTHER PUBLICATIONS

"A Digital Televison Navigator"—Chengyuan Peng & Prof. Petri Vuorimaa—ACM Multimedia 2000 (pps: 429–431).*

"A SI/PSI, RSMS Data Stream and PCR/PTS Processing Algorithm for KoreaSat Digital DBS Systerm"—Don–Hee Han, Kyu–Tae Yang & Jin–Ho Kim—vol. 44, No. 2, May 1998 IEEE (pps: 398–404).*

"Customizing Information Capture and Access"—Daniela Rus & Devika Subramanian—ACM Transaction on Information System vol. 15, No. 1, Jan. 1997, (pps: 67–101).*

"Video Segment for Content–Based Coding"—Thomas Meier & King N. Ngan—IEEE transaction on Circuits and Systems for Video technology, vol. 9, No. 8, Dec. 1999, (pps: 1190–1203).*

* cited by examiner

Primary Examiner—Jean Corrielus
Assistant Examiner—Anh Ly
(74) Attorney, Agent, or Firm—Birch, Stewart, Kolasch & Birch, LLP

(57) ABSTRACT

A device and method for filtering added information, in which PSI (Program Specification Information) in a transport stream is processed in an MPEG-2 system layer, are provided. The device includes a memory for storing table IDs and version numbers of sections for each of the table IDs, a combination of at least one of the sections forming a table which added information defines; a comparing unit for determining matching of a table ID included in the present section and the table IDs stored in the memory upon reception of the section, and comparing the version number of the matched table ID to the version number of a received section number; and a section processing unit for receiving and processing the present section if it is determined that the version number stored in the table ID is not the same as the version number of the received section, where by reducing a size and complexity of hardware, i.e., memories, providing an effective system by abandoning unnecessary sections instead of selecting required sections, and preventing missing sections which should be processed or wasting of the filter due to a time period required for setting the filter.

20 Claims, 4 Drawing Sheets

A:automatic setting of version number
C:completion of table
E:masking enable

DEVICE AND METHOD FOR FILTERING ADDED INFORMATION

BACKGROUND OF THE INVENTION

1. Field of the Invention

The present invention relates to a MPEG-2 transport decoder, and more particularly, to a device and method for filtering added information, in which PSI (Program Specification Information) in a transport stream is processed in an MPEG-2 system layer.

2. Background of the Related Art

The MPEG-2, widely known as a moving picture compression method, has standards on a system layer for compression of an audio data, in addition to the moving picture data, and changing the moving picture data and the audio data suitable for transmission. The system layer has two systems, one is a TS (Transport Stream), and the other is a PS (Program Stream). While the PS system forms a pack by grouping a plurality of PES (Packetized Elementary Stream), reversely the TS system divides the PES for loading on a plurality of transport packets before transmission. That is, since the TS system transmits a plurality of video and audio individual bitstreams, the TS system requires information on selection of a program from a plurality of programs, and on selection of a packet, and on how to decode the packet, that is called as PSI (Program Specification Information). The PSI is transmitted by a packet having identification codes or a packet indicated by a primary PSI. In the MPEG-2 system layer, the PSI is one of elements in the TS. In decoding and reproduction of the TS, one of the plurality of programs should be selected, and PIDs (Packet IDentification numbers) of the transport packets of the individual bitstreams required for the decoding and reproduction of the program should be known. Then, parameter information or linkage information of the individual bitstreams should be known. In order to conduct the foregoing multistage operation, a plurality of added information tables are required, which are transmitted by a data structure called as sections. Of the plurality of tables, PAT (Program Association Table) is special information transmitted by a packet with PID=0. Every program number in the PAT has a description on elements of a relevant program, and particularly, has a PID of the transport packet which transmits a PMT (Program Map Table). The PMT describes a program PID, and a PID list and annex information of a transport packet which transmits individual video and audio bitstreams. In this instance, different from the PES which deals with ES (Elementary Stream), coded video or audio data, the PSI is provided with a redundancy for making fast access available since the PSI includes information on the program. That is, the PSI has identical information repeatedly for quick starting of decoding at any time. For example, standards of the ATSC (Advanced Television Systems Committee) requires transmission of information on PAT within at least 0.1 seconds, and on PMT within 0.4 seconds. That is, if the PAT is not available, there can be a problem in decoding since the information can not be identified as being a video or an audio. However, because there is no change in the information in most of the cases, information identical to the one transmitted before is transmitted. Accordingly, a general transport decoder has an algorithm for effective processing of such repeated data, one of which known widely is the section filtering defined in a DVB (Digital Video Broadcasting) standard. That is, the MPEG-2 has standards for four PSI tables each having a basic unit called a section, a combination of which forms one table. Information may be transmitted, with the information put in one section or a plurality of sections.

The sections have syntaxes of similar formats for convenience of hardware or software, of which, the following is a private section syntax.

```
private_section( ) {
    table_id
    section_syntax_indicator
    private_indicator
    reserved
    private_section_length
    if(section_syntax_indicator == '0'){
        for(i=0; i<N; I++){
            private_date_byte
        }
    }
    else {
        table_id_extension
        reserved
        version_number
        current_next_indicator
        section_number
        last_section_number
        for(i=0;i<private_section_length-9;
            i++){
            private_date_byte:
        }
        CRC_32
    }
}
```

In the section filtering, a filter is provided for several initial data bytes in a section for processing only sections each having a data at a particular position in the section which has the same value with a preset value. That is, a match data and a mask byte (or bit) are set up for data bytes at filtering positions, so that masked data only are compared to the match data, for storage in a designated position only when the masked data is the same with the match data.

FIG. 1 illustrates one example of an 8 byte section filter, wherein, in a case mask bit is '1', a section data of a corresponding byte (or bit) is compared to a match data, for processing only sections which match the match data. 'A' type section filter in FIG. 1 illustrates a case when the mask is set up in bit units, and 'B' type section filter in FIG. 1 illustrates a case when the mask is set up in byte units. For example, it can be known that a comparison of data in the section 'A' in (a) in FIG. 1 to the match data in the 'A' type section filter with a mask bit of '1' in (c) indicates that the two data are the same. In this case it is determined that the two data are matched, and the data in the section 'A' is received and stored in a designated position. In this instance, since the data in the section 'A' and the match data in the 'B' type sector filter with a mask byte of '1' in (d) are not the same, the B type section filter does not receive the data in the section A. That is, it can be known that the section A in (a) and the A type section filter in (c) are matched, and the section B in (b) and the B type section filter in (d) are matched. Of PSI sections processed and transmitted thus, a desired PSI can be selected and processed. In fact, a DVB standard requires at least 32 section filters each with at least 8 bytes.

However, because such a section filtering requires a large amount of hardware, and a host sets up the filter directly, load on the host is great, and the host may miss sections to be processed or waste the filter due to a time period required for doing this. That is, since unnecessary portions of data, such as on section_lengths, unused bits, and etc., in FIG. 1 are masked for comparison, wastes of the hardware are resulted in.

SUMMARY OF THE INVENTION

Accordingly, the present invention is directed to device and method for filtering added information that substantially obviates one or more of the problems due to limitations and disadvantages of the related art.

An object of the present invention is to provide device and method for filtering added information, which can reduce a size of hardware.

Another object of the present invention is to provide device and method for filtering added information, which has an effective system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for filtering added information includes a memory for storing table IDs and version numbers of sections for each of the table IDs, a combination of at least one of the sections forming a table which added information defines, a comparing unit for determining match of a table ID included in the section and the table IDs stored in the memory upon reception of the section, and comparing the version number of the matched table ID to the version number of a received section number, and a section processing unit for receiving, and processing the present section if it is determined that the version number stored in the table ID the same with the table ID of the section received from the comparing unit is not the same with the version number of the received section.

The section processing unit skips the section received at the present time if it is determined at the comparing unit that no table IDs are in match, or the version number stored in the matched table ID is the same with the version number of the received section.

The section processing unit automatically sets up a version value stored in the memory with a new version number when a section with a new version is received.

If it is determined that the table ID of the section received from the comparing unit presently is in match with the table ID stored in the memory, the section processing unit determines completion of the table of the version processed presently, and mask enables the version number of the section if it is determined that the table is completed.

The section processing unit skips the section received at the present time if the version number of the section received at the present time is mask enabled.

In another aspect of the present invention, there is provided a method for filtering added information for receiving only required sections using a memory for storing table IDs and a memory for storing version numbers of the sections separate for each of the table IDs, including the steps of (1) upon reception of the section, determining match of the table ID included in the section and the table IDs stored in the memory, (2) if it is determined in the step (1) that there are the table IDs matched, determining the version number included in the received section of being the same with the version number stored in a version memory of the table ID, and (3) if it is determined in the step (2) that the two version numbers are not the same, receiving and processing the present section.

The method further includes the step of skipping the section received at the present time if it is determined in the step (1) that there are no table IDs matched, or if it is determined in the step (2) that the two version numbers are the same.

The step of skipping the section is caused when the version number of the section received at the present time is mask enabled.

The method further includes the steps of (6-1) determining completion of the table of the version processed at the present time, if it is determined in the step (1) that the table ID of the section received at the present time and the any one of table IDs stored in the memory are matched, and (6-1) mask enabling the version number of the section if it is determined in the (6-1) step that the table is completed.

The step (3) further includes the step of automatically updating the version value stored in the version memory with a new version number upon reception of a section having the new version.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
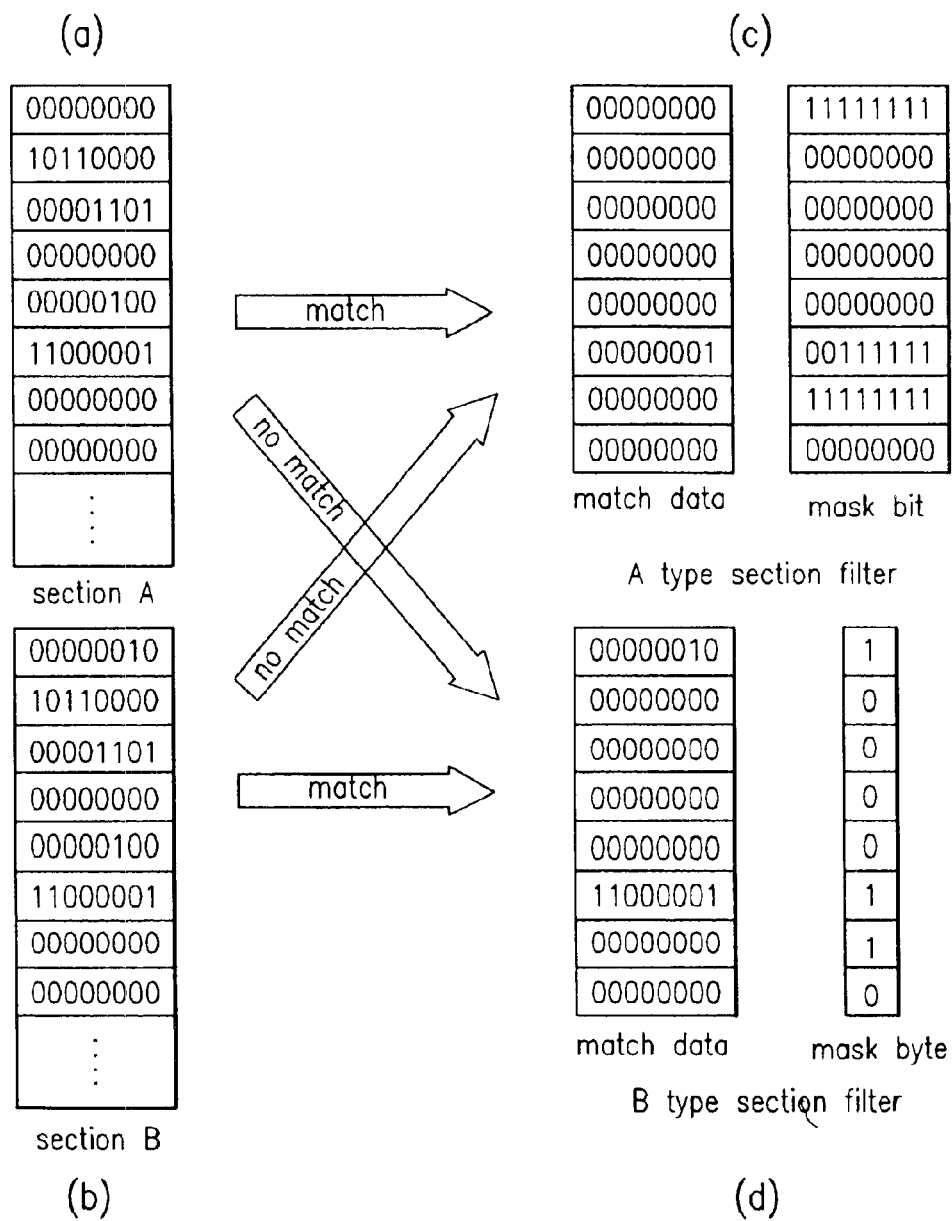
FIG. 1 illustrates an example of a related art section filter.
Figure 2:
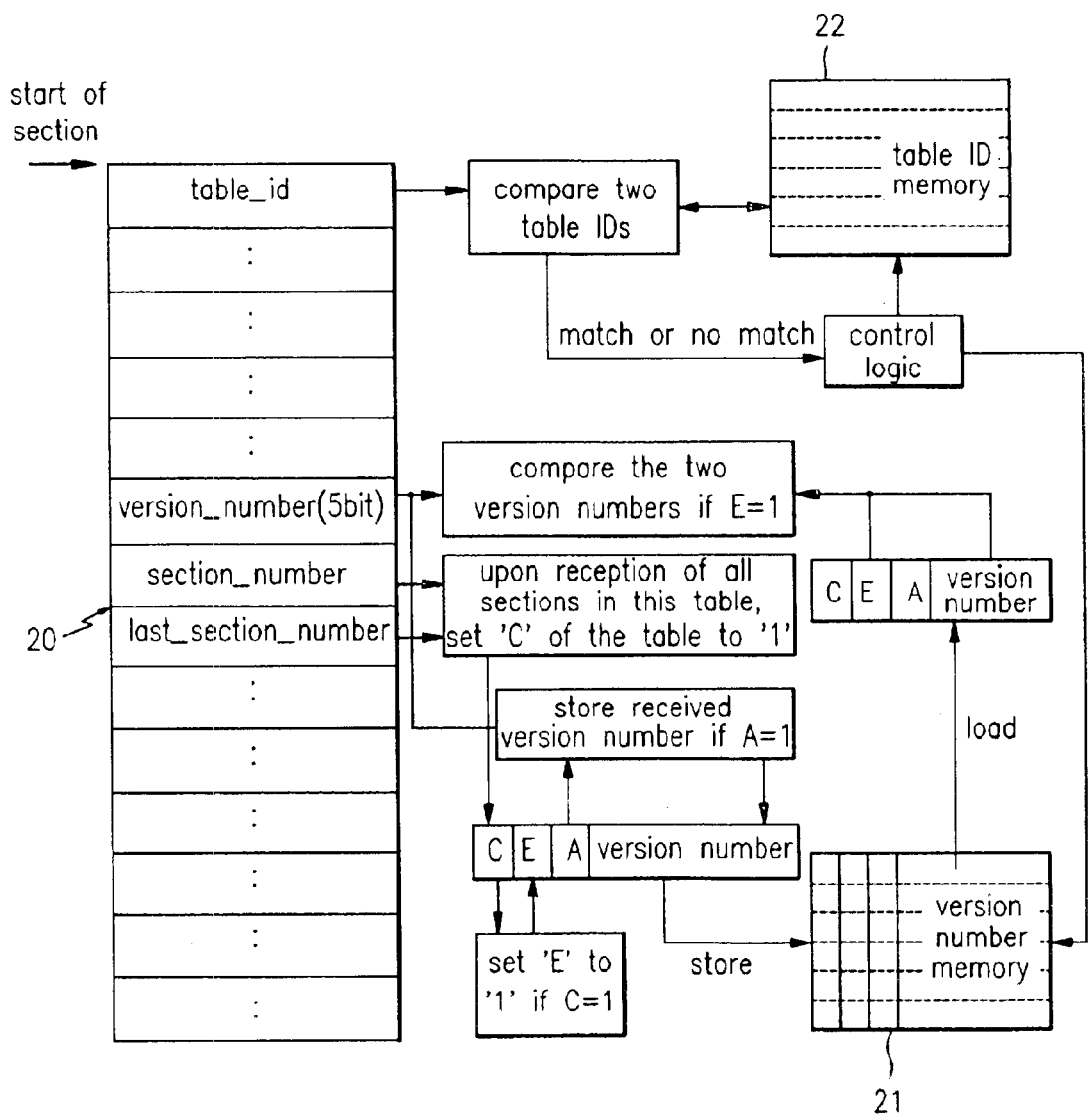
FIG. 2 illustrates a system of a hardware basis embodiment of a method for filtering added information in accordance with a preferred embodiment of the present invention.

Reference will now be made in detail to the preferred embodiments of the present invention, examples of which are illustrated in the accompanying drawings. Device and method for filtering added information of the present invention suggests application of only table IDs and version numbers to a filter for reducing a size and complexity of hardware, particularly memories. The table IDs are assigned to every table, and are included in every section. The device and method for filtering added information of the present invention also suggests receiving a data which has the same table ID, but a different version number. FIG. 2 illustrates a system of hardware basis embodiment of a method for filtering added information in accordance with a preferred embodiment of the present invention, and FIG. 3 illustrates a flow chart showing a method for filtering added information in accordance with a first preferred embodiment of the present invention, schematically.

Referring to FIG. 2, the system includes a table ID memory 22 for storing table IDs of sections, and a memory 21 for masking enable bits E for each table ID and versions to be masked. If a section 20 is received, a start of the section is searched for (S 301). If a payload unit_start_indicator is '1' in a TS packet having a PSI payload, the start of the section can be known from a pointer field. And, another section is started if the next data is not 0×FF after one section is ended. In this instance, a first byte of the section 20 is the table ID. Therefore, the table ID is compared to the table IDs stored in the table ID memory 22 (S302). If there is a table ID match, a version number assigned to the matched table ID is read from the version memory 21 for the table ID; if not, the present section is skipped. In the meantime, if there is a matched table ID, it is determined whether or not a masking enable signal 'E' is '1'. If the masking enable signal 'E' is '1', a version number in the section is compared to a version number in the version memory 21 (S 303). If the version of the present section is the same with the version in the version memory 21, and in a state of mask enable, the present version is masked. That is, the same data has been received and stored, already. Therefore, in this instance, the present data is skipped (S 304). The masking enable signal 'E' is a flag for determining storage of the received section. If the present section in the step S 303 is different from the version in the version memory 21 and there is no mask enable signal, the present section is either stored or processed (S 305).

Figure 3:
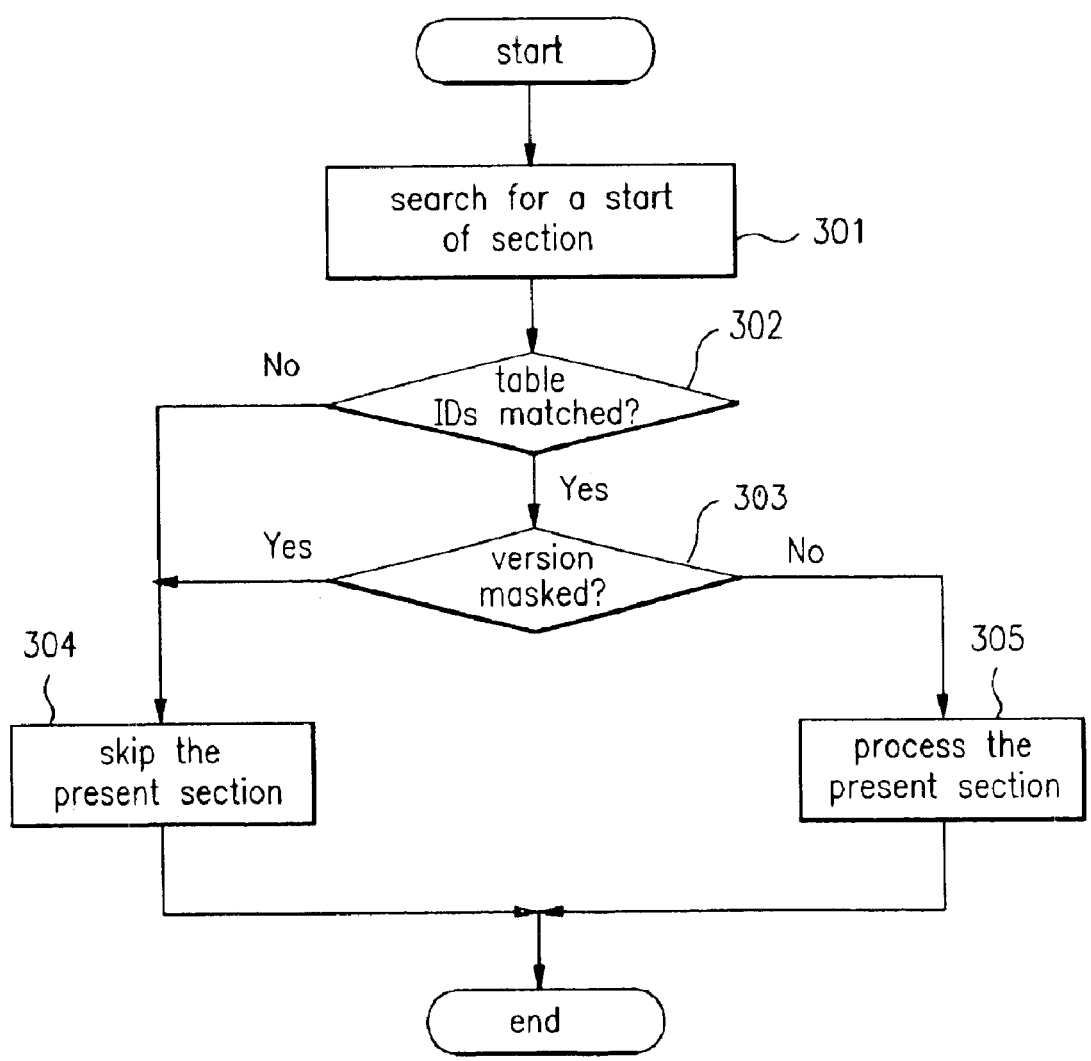
FIG. 3 illustrates a flow chart showing a method for filtering added information in accordance with a first preferred embodiment of the present invention; and, FIG. 4 illustrates a flow chart showing a method for filtering added information in accordance with a second preferred embodiment of the present invention.
Figure 4:
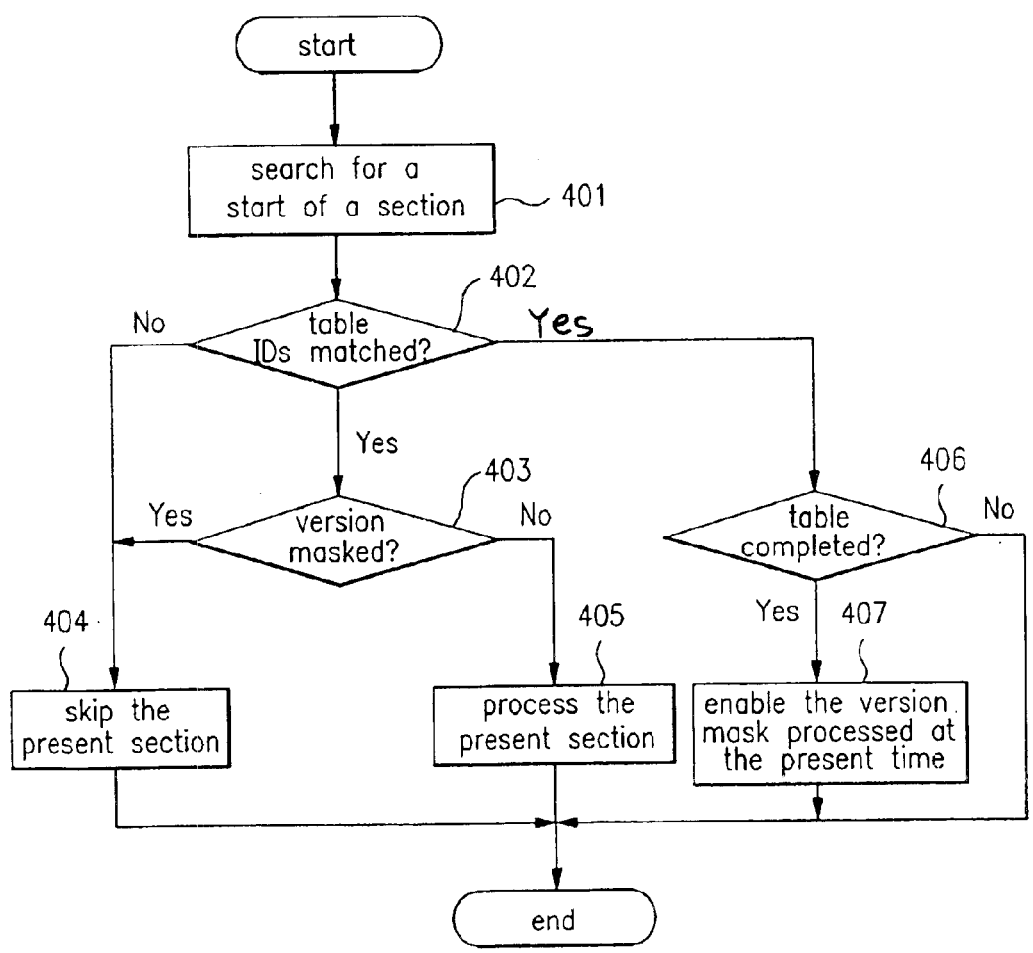

FIG. 4 illustrates a flow chart showing a method for filtering added information in accordance with a second preferred embodiment of the present invention, wherein a start of a received section is searched for in the same method with the one shown in FIG. 3 (S 401). Once the start of the section is found in the step 401, matching of the table ID in the located section and the table ID in the memory 22 is determined (S 402). If it is found in the step S 402 that the two table IDs are matching, the version number stored in the version memory 21 for the table ID and the version number of the located section are compared to each other (S 403). If it is found in the step S 403 that the version of the present section is the same with the version in the version memory 21, and the mask enable bit 'E' is '1', the present section is skipped (S 404) as the present version is masked (S 404). If it is found in the step S 403 that the version of the present section is different from the version in the version memory 21, and it is not in a mask enable state, the present section is stored or processed (S405). In the meantime, if it is determined in the step S402 that the table IDs are matching, completion of one table is determined (S406). The table is deemed completed if all sections of the table for the version processed presently are processed or no more sections are required. That is, completion of the table is verified on reception of section_number and last_section_number from the received section. If it is determined in the step S406 that the table is completed, a table completion bit 'C' of the table is set to '1', and if a version number automatic setting bit 'A' is '1', a received version number is stored in the version memory 21. The table completion bit 'C' is a flag set automatically for not processing the same sections of the version received after all the sections of one version is processed. And, the version number automatic setting bit 'A' is a flag for automatic updating of the version stored in the version memory to a new version when sections of a new version is received. That is, if it is intended to store a received version number in the memory 21, the version number is stored after the mask enable bit 'E' is set to '1' if the table completion bit 'C' is '1'.

The present invention suggests no algorithm for checking completion of the table. However, if the table has only one section, i.e., last_section_number is 0×00, the table can be provided with easy as the table is completed if the section received presently is processed. And, the present invention provides a flag which updates the version memory to a new version value upon reception of a new version, so that a rapid change of the version can be dealt with without participation of the host.

As has been described, the present invention can reduce hardware significantly in comparison to the related art section filtering. For example, sizes of a related art 8 byte section filter and a memory of the present invention are compared as follows.

If there are N section filters, the related art memory size M_sec is $$M\_sec = N \times 8 \text{ bytes} \times 2 = 128N.$$

If N table IDs are version masked in the present invention, the memory size M_ver is $$M\_ver = N \times 8 \text{ bits} \times 2 = 16N.$$

That is, it can be known that the size of the memory is reduced to ⅛. And, as the present invention can automatically set a version to be masked from the hardware, the sections can be processed without missing any section regardless of a performance of the host even if updated sections are received continuously. For example, it is assumed that there are three sections with version numbers 0×00, 0×01, 0×02 under the same table ID, and each of the sections forms one table. When sections with version numbers 0×00 are received continuously, then one section with version number 0×01 is received, and, in succession, sections with version numbers 0×02 are received continuously, a procedure for processing the three versions will be described.

In a case of the related art section filtering, the host sets the filter such that the sections with version numbers 0×00 are processed at first, and then the section with version number 0×01 is processed. And, upon reception of the section with the version number 0×01, the section is stored through the filter. The host sets the filter such that the stored section is read and decoded, and, then, the sections with version numbers 0×02 are processed. However, in the aforementioned case, the long time period required for setting the filter for processing the sections with version numbers 0×02 may lead to miss a first section of the version number 0×02. However, since the present invention suggests to mask the section with version number 0×01 at the hardware as soon as the section with version number 0×01 is received, the next sections with version numbers 0×02 can be processed without missing any of the sections with version numbers 0×02.

Such a difference comes from the design of the related art section filtering in which required sections are selected, while the version masking of the present invention is designed to abandon unnecessary sections. Since the present invention permits to process MPEG PSI effectively without employing 32 filters, the present invention can be applied to a transport decoder which uses an MPEG TS as a system layer. And, the application of the present invention to a system information field in other system layers permits reduction of hardware or intellectual decoding without participation of the host.

As has been explained, by applying the filter only to particular positions with great importance (table ID, version number) instead of general filtering, device and method for filtering added information of the present invention can reduce a size and complexity of hardware, i.e., memories, and by abandoning unnecessary sections instead of selecting required sections, an effective system can be provided, and missing sections which should be processed or wasting of the filter due to a time period required for setting the filter can be prevented. And, because reception of sections to the transport decoder is determined for reception of necessary sections only and abandoning unnecessary sections, which lessen a load on the host, a performance of the host can be improved.

It will be apparent to those skilled in the art that various modifications and variations can be made in the device and method for filtering added information of the present invention without departing from the spirit or scope of the invention. Thus, it is intended that the present invention cover the modifications and variations of this invention provided they come within the scope of the appended claims and their equivalents.

What is claimed is:

1. A device for filtering added information comprising:
    a memory for storing table IDs and a memory (M ver) for storing version numbers of sections for each of the table IDs, a combination of at least one of the sections forming a table which added information defines;
    a comparing unit for determining matching of a table ID included in a present section with the table IDs stored in the memory for storing the table IDs upon reception of the present section, and comparing the version number of the matched table ID to the version number of a received section number; and
    a section processing unit for receiving and processing the present section if it is determined that the version number stored in the matched table ID is not the same as the version number of the present section,
    a size of the memory (M ver) for storing the version numbers of the sections being equivalent to:

$M\ ver = N \times 8\ bits \times 2 = 16N,$ where N=a number of the table IDs which are version masked in the version memory (M ver).

2. A device as claimed in claim 1, wherein the section processing unit skips the section received at the present time if it is determined at the comparing unit that no table IDs match, or if the version number stored in the matched table ID is the same as the version number of the received section.

3. A device as claimed in claim 1, wherein the section processing unit automatically sets up a version value stored in the version memory with a new version number when a section with a new version is received.

4. A device as claimed in claim 1, wherein, if it is determined that the table ID of the section received from the comparing unit presently matches the table ID stored in the memory for storing the table IDs, the section processing unit determines completion of the table of the version processed presently, and mask enables the version number of the section if it is determined that the table is completed.

5. A device as claimed in claim 4, wherein the section processing unit skips the section received at the present time if the version number of the section received at the present time is mask enabled.

6. A device as claimed in claim 1, wherein the section processing unit stores the present section if it is determined that the version number stored in the matched table ID is not the same as the version number of the present section.

7. A method for filtering added information for receiving only required sections using a memory for storing table IDs and a memory (M ver) for storing version numbers of the sections separate for each of the table IDs, the method comprising the steps of:
    (1) upon reception of a present section, determining matching of the table ID included in the present section with the table IDs stored in the memory for storing table IDs;
    (2) if it is determined in the step (1) that the table IDs match, determining whether the version number included in the received section is the same as the version number stored in the version memory of the table ID; and
    (3) if it is determined in the step (2) that the two version numbers are not the same, receiving and processing the present section,
    a size of the memory (M ver) for storing the version numbers of the sections being equivalent to:

$M\ ver = N \times 8\ bits \times 2 = 16N,$ where N=a number of the table IDs which are version masked in the version memory (M ver).

8. A method as claimed in claim 7, further comprising the step of (4) skipping the section received at the present time if it is determined in the step (1) that there are no table IDs matched, or if it is determined in the step (2) that the two version numbers are the same.

9. A method as claimed in claim 8, wherein the step of skipping the section is caused when the version number of the section received at the present time is mask enabled.

10. A method as claimed in claim 7, further comprising the steps of:
    (5) determining completion of the table of the version processed at the present time, if it is determined in the step (1) that the table ID of the section received at the present time and any one of the table IDs stored in the memory for storing the table IDs match each other; and
    (6) mask enabling the version number of the present section if it is determined in the (5) step that the table is completed.

11. A method as claimed in claim 7, wherein the step (1) further includes the step of determining starting of the received section with reference to a pointer field if a payload_syntax_indicator is '1' in a transport packet before the step of determining matching of the table ID included in the section and the table IDs stored in the memory for storing the table IDs.

12. A method as claimed in claim 7, wherein the step (1) further includes the step of determining starting of another section if the next data is not 0×FF after the present section comes to an end before the step of determining matching of the table ID included in the section and the table IDs stored in the memory for storing the table IDs.

13. A method as claimed in claim 7, wherein the step (3) further includes the step of automatically updating a version value stored in the version memory with a new version number upon reception of a section having the new version.

14. A method as claimed in claim 7, wherein the step (3) includes the step of storing the present section if it is determined in the step (2) that the two version numbers are not the same.

15. A device for filtering added information comprising:
    first means for storing table IDs and version numbers of sections for each of the table IDs, a combination of at least one of the sections forming a table which added information defines;

second means for determining matching of a table ID included in a present section with the table IDs stored in the first means upon reception of the present section, and comparing the version number of the matched table ID to the version number of a received section number; and third means for receiving and processing the present section if it is determined that the version number stored in the matched table ID is not the same as the version number of the present section, wherein the first means for storing the table IDs and the version numbers of the sections for each of the table IDs includes a version memory (M ver) for storing the version numbers of the sections, and wherein a size of the version memory (M ver) is equivalent to:

$$M\ ver = N \times 8\ bits \times 2 = 16N,$$

where N=a number of the table IDs which are version masked in the version memory (M ver).

16. A device as claimed in claim 15, wherein the third means skips the section received at the present time if it is determined at the second means that no table IDs match, or if the version number stored in the matched table ID is the same as the version number of the received section.

17. A device as claimed in claim 15, wherein the third means automatically sets up a version value stored in the first means with a new version number when a section with a new version is received.

18. A device as claimed in claim 15, wherein, if it is determined that the table ID of the section received from the second means presently matches the table ID stored in the first means, the third means determines completion of the table of the version processed presently, and mask enables the version number of the section if it is determined that the table is completed.

19. A device as claimed in claim 18, wherein the third means skips the section received at the present time if the version number of the section received at the present time is mask enabled.

20. A device as claimed in claim 15, wherein the third means stores the present section if it is determined that the version number stored in the matched table ID is not the same as the version number of the present section.

* * * * *